US008663565B2

(12) United States Patent
Faucher et al.

(10) Patent No.: US 8,663,565 B2
(45) Date of Patent: Mar. 4, 2014

(54) CONTINUOUS EMULSIFICATION—AGGREGATION PROCESS FOR THE PRODUCTION OF PARTICLES

(75) Inventors: Santiago Faucher, Ontario (CA); Kimberly D. Nosella, Ontario (CA); David Thomas Borbely, Ontario (CA); Gaetano Lavigne, Ontario (CA); Simon C. Burke, Ontario (CA)

(73) Assignee: Xerox Corporation, Norwalk, CT (US)

( * ) Notice: Subject to any disclaimer, the term of this patent is extended or adjusted under 35 U.S.C. 154(b) by 32 days.

(21) Appl. No.: 13/025,664

(22) Filed: Feb. 11, 2011

(65) Prior Publication Data

US 2012/0208123 A1    Aug. 16, 2012

(51) Int. Cl.
*B01J 19/18* (2006.01)
*G03G 9/093* (2006.01)

(52) U.S. Cl.
USPC .. 422/134; 422/135; 430/137.12; 430/137.14

(58) Field of Classification Search
USPC .......... 430/137.11, 137.14, 137.12; 422/134, 422/135, 138, 145, 156, 601
See application file for complete search history.

(56) References Cited

U.S. PATENT DOCUMENTS

| | | | |
|---|---|---|---|
| 3,590,000 | A | 6/1971 | Palermiti et al. |
| 3,655,374 | A | 4/1972 | Palermiti et al. |
| 3,720,617 | A | 3/1973 | Chatterji et al. |
| 3,800,588 | A | 4/1974 | Larson et al. |
| 3,847,604 | A | 11/1974 | Hagenbach et al. |
| 3,944,493 | A | 3/1976 | Jadwin et al. |
| 3,983,045 | A | 9/1976 | Jugle et al. |
| 4,007,293 | A | 2/1977 | Mincer et al. |
| 4,079,014 | A | 3/1978 | Burness et al. |
| 4,113,796 | A | 9/1978 | Bischoff et al. |
| 4,265,990 | A | 5/1981 | Stolka et al. |
| 4,295,990 | A | 10/1981 | Verbeek et al. |
| 4,394,430 | A | 7/1983 | Jadwin et al. |
| 4,560,635 | A | 12/1985 | Hoffend et al. |
| 4,563,408 | A | 1/1986 | Lin et al. |
| 4,584,253 | A | 4/1986 | Lin et al. |
| 4,855,113 | A * | 8/1989 | Yen ............................... 422/259 |
| 4,858,884 | A | 8/1989 | Harwath |
| 4,935,326 | A | 6/1990 | Creatura et al. |
| 4,937,166 | A | 6/1990 | Creatura et al. |

(Continued)

OTHER PUBLICATIONS

"Operation and Optimization of an Oscillatory Flow Continuous Reactor"; A.P. Harey et al., *Ind. Eng. Chem. Res.* 2001, 40, pp. 5371-5377.

(Continued)

*Primary Examiner* — Jonathan Jelsma
(74) *Attorney, Agent, or Firm* — MDIP LLC

(57) ABSTRACT

A continuous emulsion aggregation process for the production of particles is presented including a plurality of continuous stirred-tank reactors (CSTR). The plurality of continuous stirred-tank reactors includes at least one feed tank of raw materials, at least one reactor for facilitating cold addition, at least two reactors for facilitating an aggregation process, at least one reactor for facilitating a shell addition process; at least one reactor for facilitating a freeze process, at least one reactor for facilitating a chelating process, at least one reactor for facilitating a ramp-up process and at least one reactor for facilitating a coalescence process, wherein the reactors are sequentially assembled in a series configuration and separated by short conduits to produce toner particles that are narrowly distributed.

17 Claims, 3 Drawing Sheets

(56) References Cited

U.S. PATENT DOCUMENTS

| | | | |
|---|---|---|---|
| 5,227,460 A | 7/1993 | Mahabadi et al. | |
| 5,236,629 A | 8/1993 | Mahabadi et al. | |
| 5,264,315 A * | 11/1993 | Tan et al. | 430/137.12 |
| 5,278,020 A | 1/1994 | Grushkin et al. | |
| 5,290,654 A | 3/1994 | Sacripante et al. | |
| 5,302,486 A | 4/1994 | Patel et al. | |
| 5,308,734 A | 5/1994 | Sacripante et al. | |
| 5,330,874 A | 7/1994 | Mahabadi et al. | |
| 5,344,738 A | 9/1994 | Kmiecik-Lawrynowicz et al. | |
| 5,346,797 A | 9/1994 | Kmiecik-Lawrynowicz et al. | |
| 5,348,832 A | 9/1994 | Sacripante et al. | |
| 5,364,729 A | 11/1994 | Kmiecik-Lawrynowicz et al. | |
| 5,366,841 A | 11/1994 | Patel et al. | |
| 5,370,963 A | 12/1994 | Patel et al. | |
| 5,403,693 A | 4/1995 | Patel et al. | |
| 5,405,728 A | 4/1995 | Hopper et al. | |
| 5,418,108 A | 5/1995 | Kmiecik-Lawrynowicz et al. | |
| 5,496,676 A | 3/1996 | Croucher et al. | |
| 5,501,935 A | 3/1996 | Patel et al. | |
| 5,527,658 A | 6/1996 | Hopper et al. | |
| 5,585,215 A | 12/1996 | Ong et al. | |
| 5,650,255 A | 7/1997 | Ng et al. | |
| 5,650,256 A | 7/1997 | Veregin et al. | |
| 5,733,758 A * | 3/1998 | Nguyen | 435/162 |
| 5,853,943 A | 12/1998 | Cheng et al. | |
| 6,004,714 A | 12/1999 | Ciccarelli et al. | |
| 6,063,827 A | 5/2000 | Sacripante et al. | |
| 6,114,415 A | 9/2000 | Bertelo et al. | |
| 6,190,815 B1 | 2/2001 | Ciccarelli et al. | |
| 6,214,507 B1 | 4/2001 | Sokol et al. | |
| 6,593,049 B1 | 7/2003 | Veregin et al. | |
| 6,756,176 B2 | 6/2004 | Stegamat et al. | |
| 6,776,925 B2 * | 8/2004 | Hofmann et al. | 252/182.24 |
| 6,830,860 B2 | 12/2004 | Sacripante et al. | |
| 7,037,633 B2 | 5/2006 | Hopper et al. | |
| 7,344,813 B2 | 3/2008 | Sweeney et al. | |
| 7,390,606 B2 | 6/2008 | Patel et al. | |
| 7,452,646 B2 | 11/2008 | Hu et al. | |
| 7,507,517 B2 | 3/2009 | Wolfe et al. | |
| 7,560,505 B2 | 7/2009 | Agur et al. | |
| 8,080,360 B2 | 12/2011 | Marcello et al. | |
| 2002/0076637 A1 | 6/2002 | Iwa et al. | |
| 2004/0186269 A1 * | 9/2004 | Steinbrenner et al. | 528/408 |
| 2004/0265727 A1 * | 12/2004 | Vanbesien et al. | 430/137.1 |
| 2006/0222989 A1 | 10/2006 | Vanbesien et al. | |
| 2006/0222991 A1 | 10/2006 | Sacripante et al. | |
| 2006/0269859 A1 | 11/2006 | Skorokhod et al. | |
| 2006/0286478 A1 | 12/2006 | Chung et al. | |
| 2007/0082980 A1 * | 4/2007 | Lai et al. | 524/35 |
| 2007/0141494 A1 | 6/2007 | Zhou et al. | |
| 2008/0182191 A1 | 7/2008 | Moffat et al. | |
| 2008/0242875 A1 * | 10/2008 | Hong et al. | 549/42 |
| 2009/0264585 A1 | 10/2009 | Avramidis et al. | |
| 2011/0097664 A1 * | 4/2011 | Nosella et al. | 430/137.14 |
| 2011/0104609 A1 * | 5/2011 | Qiu et al. | 430/137.14 |
| 2012/0183898 A1 * | 7/2012 | Faucher et al. | 430/137.14 |

OTHER PUBLICATIONS

"Process Intensification of Biodiesel Production Using a Continuous Oscillatory Flow Reactor"; Adam P. Harvey et al., *Journal of Chemical Technology and Biotechnology* 2003, 78, pp. 338-341.

* cited by examiner

CONTINUOUS EMULSIFICATION—AGGREGATION PROCESS FOR THE PRODUCTION OF PARTICLES

CROSS REFERENCE TO RELATED APPLICATION

The present application relates to co-pending U.S. patent application Ser. No. 13/008,278 and filed on Jan. 18, 2011 entitled, "CONTINUOUS EMULSIFICATION-AGGREGATION PROCESS FOR THE PRODUCTION OF PARTICLES," the disclosure of which is hereby incorporated by reference in its entirety.

BACKGROUND

The present disclosure relates to emulsion aggregation processes. More specifically, the present disclosure relates to production of emulsion aggregation toner particles via a series of continuous stirred tank reactors (CSTR).

Processes for forming toner compositions for use with electrophotographic print or copy devices have been previously disclosed. For example, methods of preparing an emulsion aggregation (EA) type toner are known and toners may be formed by aggregating a colorant with a latex polymer formed by batch or semi-continuous emulsion polymerization. For example, U.S. Pat. No. 5,853,943, the disclosure of which is hereby incorporated by reference in its entirety, is directed to a semi-continuous emulsion polymerization process for preparing a latex by first forming a seed polymer. Other examples of emulsion/aggregation/coalescing processes for the preparation of toners are illustrated in U.S. Pat. Nos. 7,785,763, 7,749,673, 7,695,884, 7,615,328, 7,429,443, 7,329,476, 6,830,860, 6,803,166, 6,764,802, the disclosures of each of which are hereby incorporated by reference in their entirety.

As noted above, latex polymers utilized in the formation of EA type toners may be formed by batch or semi-continuous emulsion polymerization. Batch processes for producing resins may be subjected to bulk polycondensation polymerization in a batch reactor at an elevated temperature. The time required for the polycondensation reaction is long, due to heat transfer of the bulk material, high viscosity, and limitations on mass transfer. The resulting resin is then cooled, crushed, and milled prior to being dissolved into a solvent. The dissolved resin is then subjected to a phase inversion process where the polyester resin is dispersed in an aqueous phase to prepare polyester latexes. The solvent is then removed from the aqueous phase by a distillation method.

In addition, where a batch process is utilized for aggregation and/or coalescence of latex, because the individual batch process involves the handling of bulk amounts of material and heating of these materials, each process may take many hours to complete before moving to the next process in the formation of the toner particles, that is, aggregation and/or coalescence. In addition, batch-to-batch consistency is frequently difficult to achieve because of variations that may arise from one batch to another.

Moreover, methods of improving the space time yield of the EA process have been previously examined, but without yielding particles of interest. For example, continuous tubular reactors have been studied, but some issues remain with respect to their use at producing toner particles.

Therefore, other reactors for the preparation of toner particles in a continuous process are desirable. Such reactors should be more efficient, take less time, result in a consistent toner particle product, and be environmentally friendly.

SUMMARY

The present disclosure provides for a continuous emulsion aggregation system. The system includes at least one feed tank of raw materials; at least one reactor for facilitating cold addition; at least two reactors for facilitating an aggregation process; at least one reactor for facilitating a shell addition process; at least one reactor for facilitating a freeze process; at least one reactor for facilitating a chelating process; at least one reactor for facilitating a ramp-up process; and at least one reactor for facilitating a coalescence process; wherein the reactors are sequentially assembled in a series configuration.

A space time yield of the particles in the reactor is from about 10 g particles/L/hr to about 500 g particles/L/hr. Each of the reactors is temperature controlled by externally applied cooling or heating devices. Material flows from one reactor to the next via a conduit. Fluid is pumped continuously from one reactor to the next. The reactors are separated from each other by orifice plates.

In a further embodiment, the materials are mixed at independent rates for each reactor in order to control particle size and particle size distribution. Reactor temperatures are incrementally higher in the direction of material flow. A residence time of each reactor is from about 0.5 minutes to about 60 minutes. pH is controlled in each reactor by altering the feed rate of basic or acidic solutions to each reactor, the pH being measured by a plurality of pH probes.

Additionally, each reactor is associated with an impeller to assist movement of materials through the reactor.

In further embodiments, a method of the present disclosure may include providing a plurality of reactors sequentially assembled in a series configuration; introducing raw materials for the toner particles into a continuous stirred tank reactor system; facilitating cold addition via a first reactor; facilitating an aggregation process via a second reactor and a third reactor; facilitating a shell addition process via a fourth reactor; facilitating a freeze process via a fifth reactor; facilitating a chelating process via a sixth reactor; facilitating a ramp-up process via a seventh reactor; and facilitating a coalescence process via an eighth reactor.

BRIEF DESCRIPTION OF THE DRAWINGS

Various embodiments of the present disclosure will be described herein below with reference to the figures wherein.

DETAILED DESCRIPTION OF EMBODIMENTS

The present disclosure provides for a process, formulation, and mechanical equipment setup for the continuous production of emulsion aggregation (EA) toner particles that has a space time yield of from about 0.1 g/L/hr to about 500 g/L/hr, in embodiments from about 0.2 g/L/hr to about 400 g/L/hr, in embodiments about 90 g/L/hr. As used herein, a space time yield, in embodiments, represents the mass of a product P formed, per total reactor volume used, per total residence time in the total reactor volume. The following formula is applied to determine the space time yield;

$$\sigma_p = m_p/Vt$$

where $m_p$ is the mass of the dry toner (product), V is the total reactor volume and t is total reactor residence time.

The processes of the present disclosure rely on a series of continuous stirred-tank reactors (CSTR) to undertake the various steps of an EA process. Each reactor is set to operate under a specific set of conditions to attain the desired effect on the particle size, particle size distribution, circularity, and other such factors pertinent to achieving toner particles. In addition, recent advances in high throughput EA have been combined with this setup to increase the speed of the EA process such as, for example, the use of caustic buffers in lieu of bases.

Continuous Emulsion Aggregation Process with CSTRs

Figure 1:
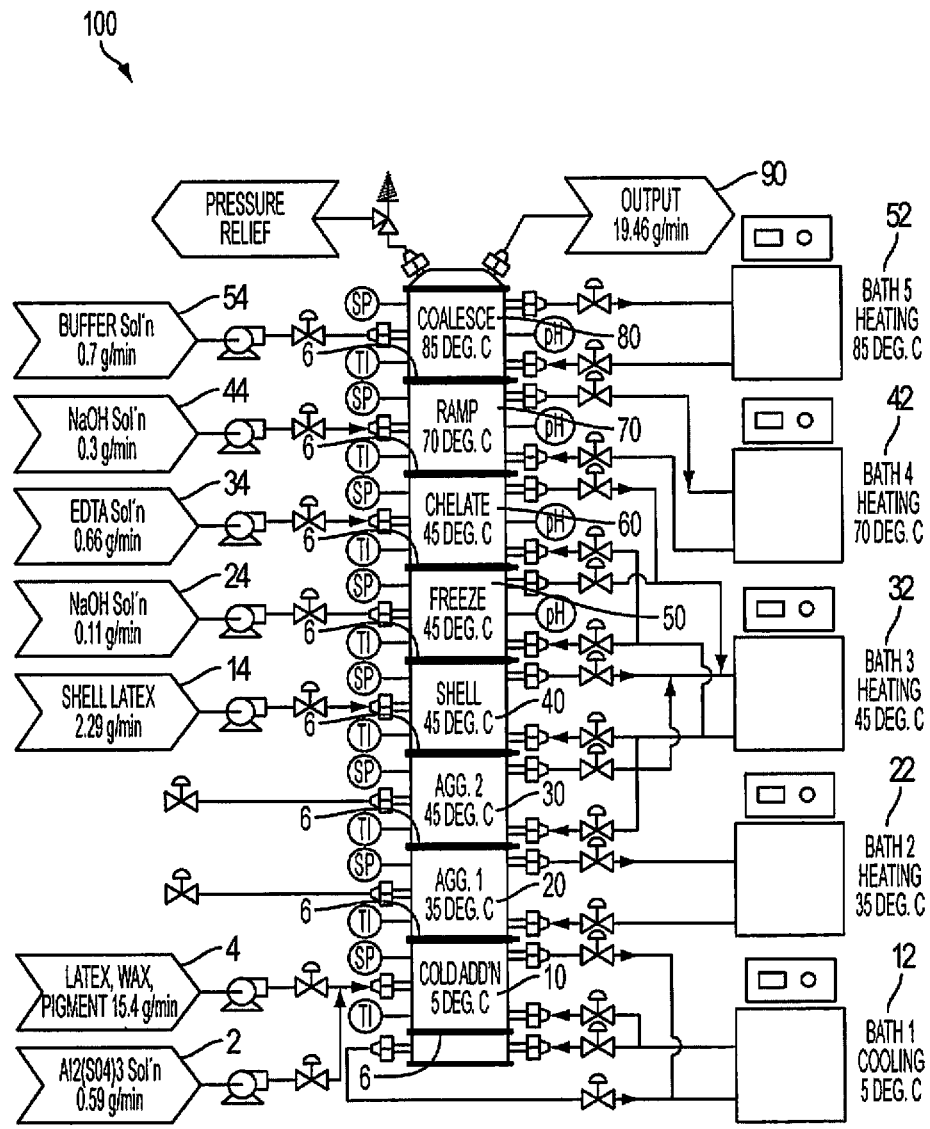
FIG. 1 schematically shows a process and instrumentation diagram for a continuous emulsion aggregation (EA) system of the present disclosure.
Figure 2:
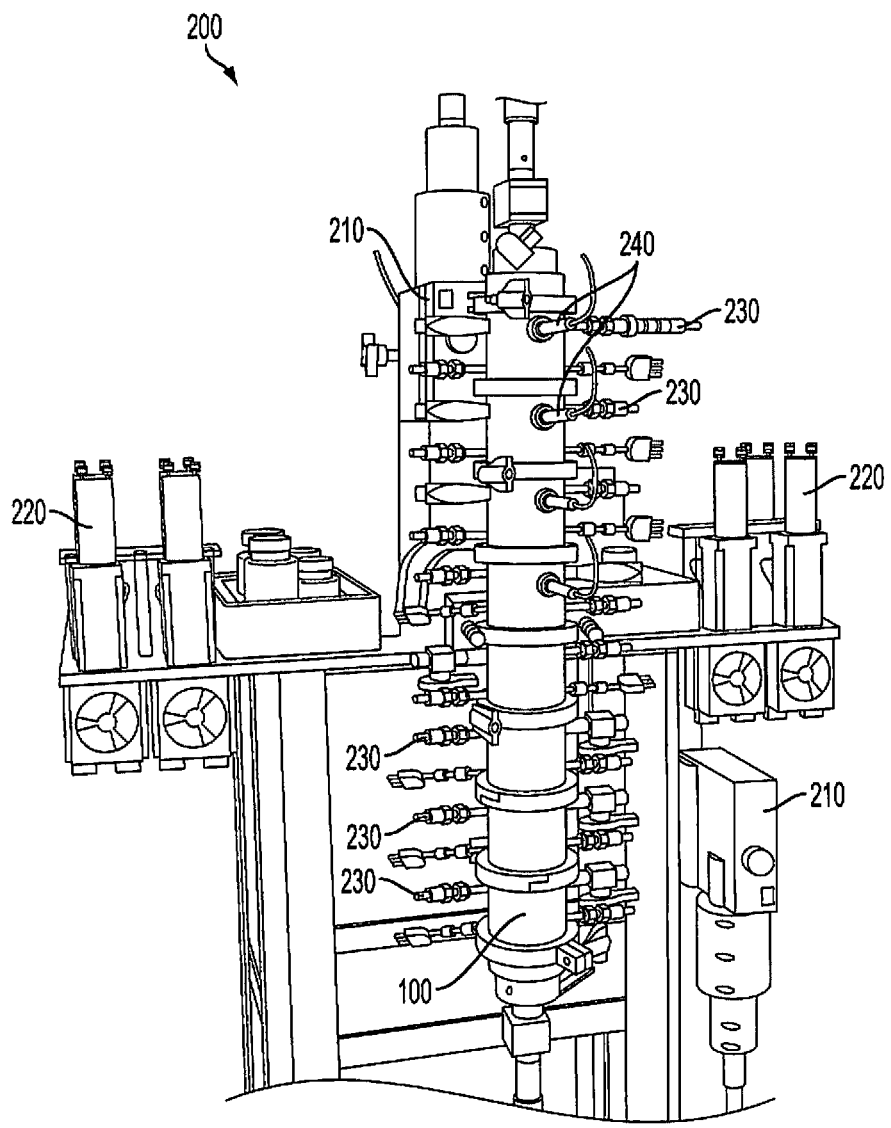
FIG. 2 schematically shows a three-dimensional view of the continuous emulsion aggregation (EA) system of the present disclosure.
Figure 3:
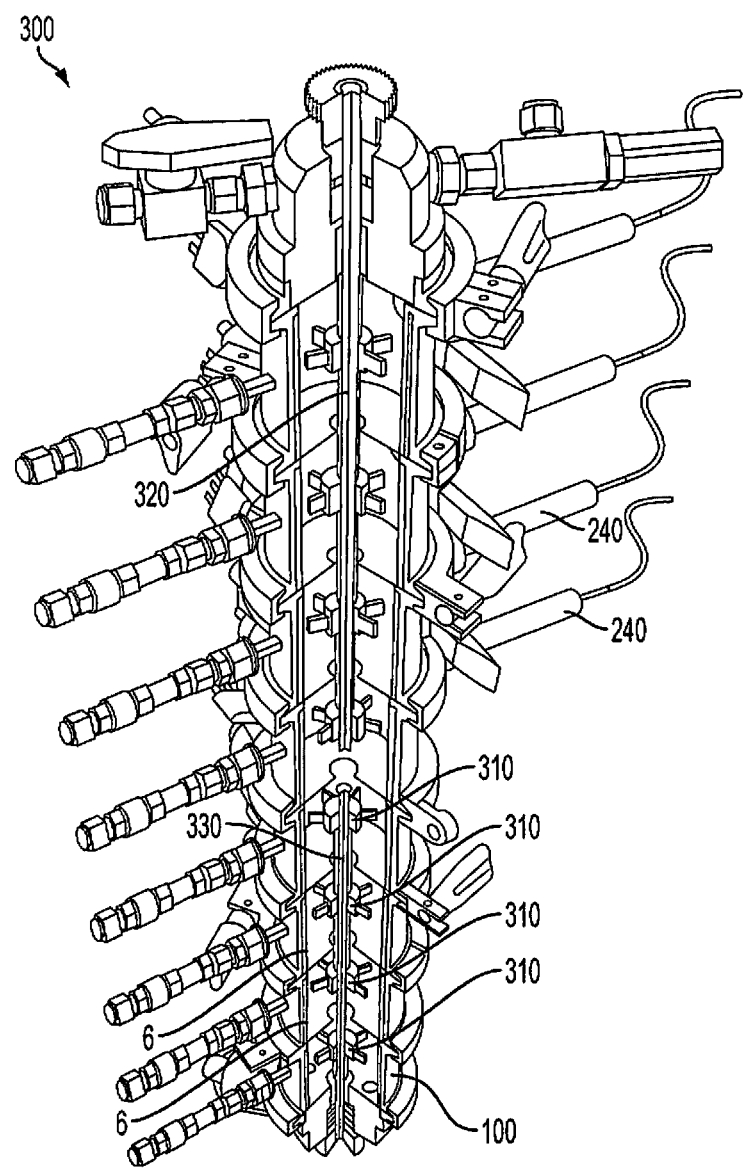
FIG. 3 schematically shows an internal, cut-away view of the continuous emulsion aggregation (EA) system of the present disclosure.

In accordance with the present disclosure, FIGS. 1-3 outline a design of a Continuous EA Reactor (CEAR). The flow of the system is described in FIG. 1 and in Examples 1 and 2 outline the operation of the system. The reactor is divided into 8 stages. These stages are a cold addition stage, a first aggregation stage, a second aggregation stage, a shell stage, a freeze stage, a chelate stage, a ramp stage, and a coalescence stage.

Referring to FIG. 1, a CSTR system 100 is presented having a first reactor stage 10, a second reactor stage 20, a third reactor stage 30, a fourth reactor stage 40, a fifth reactor stage 50, a sixth reactor stage 60, a seventh reactor stage 70, and an eighth reactor stage 80. The reactors 10, 20, 30, 40, 50, 60, 70, 80 are configured in a series configuration and are separated from each other by orifice plates 6, as discussed below.

Stage 1: Cold Addition:

In the first stage 10, also known as the cold addition stage 10, cold feeds of $Al_2(SO_4)_3$ in the first stream 2, and a mixture of various resin emulsions, wax dispersions, and colorant dispersions in the second stream 4, are pumped into the continuous reactor system 100. The process fluid in this first reactor is kept cold, between 0 and 15° C., by circulating a cold fluid in the external jacket of the reactor. A cooling bath 12 supplies the heat transfer fluid to the reactor's jacket. The wall of the reactor is kept between a temperature range through an external heat exchanger (described below).

As the materials of the first stream 2 and the second stream 4 are pumped into the reactor system 100, such materials move up from one stage to the next through an orifice plate 6 that separates the first and second stages (e.g., first aggregation stage 20). The orifice plate 6 prevents complete mixing of the materials in the first and second stages 10, 20. This ensures that each stage acts as a distinct continuous stirred tank reactor (CSTR). The remaining stages are separated in a similar manner through orifice plates 6, as seen in FIG. 1.

In the cold addition stage 10, a shaft 330 (see FIG. 3) rotates at a predetermined speed and on the shaft 330 may be affixed an impeller 310 (see FIG. 3) whose design is modified as needed to obtain the desired degree of mixing for the first stage 10.

Stage 2: First Aggregation:

As materials enter the second stage 20, (i.e., the first aggregation stage), the materials are heated by a heat transfer fluid circulating in the reactor's jacket and supplied by a circulating bath 22 set at a predetermined temperature. As the materials flow into this reactor 20 and are mixed, heat is transferred from the internal walls of the reactor to the fluid by convective and conductive heat transfer. This temperature change triggers the aggregation of the latexes and dispersions such that particles are formed.

Stage 3: Second Aggregation:

The materials from the second stage 20, flow through an orifice plate 6 into the third stage 30 (i.e., the second aggregation stage 30), where the materials are further heated the reactor jacket and heat transfer fluid supplied by heating bath 32 which is set at a temperature higher than the temperature of the second stage 20. This higher temperature causes the particles to grow further in size.

Stage 4: Shell Addition:

The materials from the third stage 30, flow through the orifice plate 6 and into the fourth stage 40 (i.e., the shell addition stage 40), where fresh latex 14 is pumped in to form a shell around the particles formed in the prior stages 10, 20, and 30. The heating bath 32 supplying heat transfer fluid to the reactor jacket temperature in the fourth stage 40 is set at a predetermined temperature to achieve a desired slurry temperature. Shaft 330 (see FIG. 3) rotates in stages 1 through 4 to stir the contents of each stage 10, 20, 30, and 40. The impeller 310, as shown in FIG. 3, is designed to provide the desired stirring in each stage 10, 20, 30, and 40. The impeller 310 may be of any type that is suitable to move the materials and achieve the desired particle size and distribution. FIG. 3 shows Rushton turbines as an example of a possible impeller type. However, one skilled in the art may contemplate using any type and any number of shafts and impellers to achieve the desired stirring or mixing effects of the materials inserted into the reactor system 100.

Stage 5: Freeze:

In the fifth stage 50, sodium hydroxide, or any other suitable solution such as a buffer solution 24, is pumped in to stop the growth of the particles. This sodium hydroxide solution mixes with the materials entering this stage from the fourth stage 40 through the previous orifice plate 6. The freezing process ensures that the desired particle sizes are achieved for the end use application. The slurry temperature in this reactor is controlled by an external jacket and heating bath 32 set at a predetermined temperature.

Stage 6: Chelate:

In the sixth stage 60, a chelating solution 34 is added to remove ions from the particles. The chelating solution 34 mixes with the materials entering this stage from the fifth stage 50 through the previous orifice plate 6. The slurry temperature in this reactor is controlled by the external jacket and heating bath 32 set at a predetermined temperature.

Stage 7: Ramp:

In the seventh stage 70, the slurry temperature is controlled by an external jacket and heating bath 42 to be higher than the slurry temperature in stage 60 which is entering through the orifice plate 6 separating the sixth and seventh stages 60, 70. In addition, a solution may be added to this reactor continuously to control the pH.

Stage 8: Coalescence:

In the eighth stage 80, the slurry temperature is controlled by an external jacket and heating bath 52 to be higher than the slurry temperature entering through the orifice plate 6 separating the seventh and eighth stages 70, 80. In addition, a solution may be added to accelerate the coalescence process. Shaft 320 (see FIG. 3) rotates in the fifth, sixth, seventh, and eighth stages 50, 60, 70, and 80, to stir the contents of each stage 50, 60, 70, and 80.

The impeller 310 (see FIG. 3) in each section is designed to provide the desired stirring in each of the stages 10, 20, 30, 40, 50, 60, 70, and 80. The impeller 310 may be of any type that is suitable to move the materials and achieve the desired particle size and distribution. Once again, FIG. 3 shows Rushton turbines as an example of a possible impeller type. However, one skilled in the art may contemplate using any type and any number of shafts and impellers to achieve the desired stirring or mixing effects of the materials inserted into the reactor system 100.

Additionally, as shown in FIGS. 2 and 3, pH probes 240 may be mounted on the reactor such that the pH may be continuously monitored. Thermocouples (not shown) may also be mounted such that the temperature of each stage may be continuously monitored.

Exiting Reactor:

The material that exits the eighth stage 80 is collected in a tank 90 and later processed into the final product.

FIG. 2 illustrates a three-dimensional view 200 of the continuous emulsion aggregation (EA) system in accordance with the present disclosure. The reactor system 100 operatively communicates with at least two motor drives 210 and at least two pumps 220. The reactor system 200 also includes a plurality of heating jackets 230 across its length in equidistant positions. Additionally, the reactor system 100 may include a plurality of pH probes 240 (see FIGS. 2 and 3). The pH probes may be in operative communication with each of the stages 10, 20, 30, 40, 50, 60, 70, and 80.

FIG. 3 illustrates an internal, cut-away view 300 of the continuous emulsion aggregation (EA) system in accordance with the present disclosure. FIG. 3 clearly illustrates the impellers 310 positioned equidistantly within the reactor system 100. An impeller 310 may be located within every stage 10, 20, 30, 40, 50, 60, 70, and 80. FIG. 3 also illustrates the plurality of orifice plates, which separate the stages 10, 20, 30, 40, 50, 60, 70, and 80 from each other. The chamber size of each stage 10, 20, 30, 40, 50, 60, 70, and 80 may be the same or may be different relative to the other stage chambers. Moreover, FIG. 3 illustrates the shafts 320, 330 used to stir the contents in the various stages 10-80. Of course, one skilled in the art may contemplate using a plurality of shafts in a number of different configurations for stirring the contents of the plurality of chambers, each being a different stage in a continuous EA process.

Any component and/or material suitable for use in forming toner particles may be utilized with a system of the present disclosure as described herein. Exemplary components and materials that may be utilized to form toner particles with a system of the present disclosure are set forth below.

Of course, one skilled in the art may contemplate using a plurality of reactors in a series configuration, where the above steps are interchanged, where the size of the reactors is changed, where the temperature of each reactor is changed, and/or where the residence time is changed to achieve the results of the embodiments described above.

While the above description has identified specific components of a toner and materials utilized to form such toners, e.g., specific resins, colorants, waxes, surfactants, bases, buffers, etc., it is understood that any component and/or material suitable for use in forming toner particles may be utilized with a system of the present disclosure as described herein. Exemplary components and materials that may be utilized to form toner particles with a system of the present disclosure are set forth below.

Resins

Any resin may be utilized in forming a latex emulsion of the present disclosure. In embodiments, the resins may be an amorphous resin, a crystalline resin, and/or a combination thereof. In further embodiments, the resin may be a polyester resin, including the resins described in U.S. Pat. Nos. 6,593,049 and 6,756,176, the disclosures of each of which are hereby incorporated by reference in their entirety. Suitable resins may also include a mixture of an amorphous polyester resin and a crystalline polyester resin as described in U.S. Pat. No. 6,830,860, the disclosure of which is hereby incorporated by reference in its entirety.

In embodiments, the resin may be a polyester resin formed by reacting a diol with a diacid in the presence of an optional catalyst. For forming a crystalline polyester, suitable organic diols include aliphatic diols with from about 2 to about 36 carbon atoms, such as 1,2-ethanediol, 1,3-propanediol, 1,4-butanediol, 1,5-pentanediol, 2,2-dimethylpropane-1,3-diol, 1,6-hexanediol, 1,7-heptanediol, 1,8-octanediol, 1,9-nonanediol, 1,10-decanediol, 1,12-dodecanediol and the like including their structural isomers. The aliphatic dial may be, for example, selected in an amount of from about 40 to about 60 mole percent, in embodiments from about 42 to about 55 mole percent, in embodiments from about 45 to about 53 mole percent, and a second diol can be selected in an amount of from about 0 to about 10 mole percent, in embodiments from about 1 to about 4 mole percent of the resin.

Examples of organic diacids or diesters including vinyl diacids or vinyl diesters selected for the preparation of the crystalline resins include oxalic acid, succinic acid, glutaric acid, adipic acid, suberic acid, azelaic acid, sebacic acid, fumaric acid, dimethyl fumarate, dimethyl itaconate, cis, 1,4-diacetoxy-2-butene, diethyl fumarate, diethyl maleate, phthalic acid, isophthalic acid, terephthalic acid, naphthalene-2,6-dicarboxylic acid, naphthalene-2,7-dicarboxylic acid, cyclohexane dicarboxylic acid, malonic acid and mesaconic acid, a diester or anhydride thereof. The organic diacid may be selected in an amount of, for example, in embodiments from about 40 to about 60 mole percent, in embodiments from about 42 to about 52 mole percent, in embodiments from about 45 to about 50 mole percent, and a second diacid can be selected in an amount of from about 0 to about 10 mole percent of the resin.

Examples of crystalline resins include polyesters, polyamides, polyimides, polyolefins, polyethylene, polybutylene, polyisobutyrate, ethylene-propylene copolymers, ethylene-vinyl acetate copolymers, polypropylene, mixtures thereof, and the like. Specific crystalline resins may be polyester based, such as poly(ethylene-adipate), poly(propylene-adipate), poly(butylene-adipate), poly(pentylene-adipate), poly(hexylene-adipate), poly(octylene-adipate), poly(ethylene-succinate), polypropylene-succinate), poly(butylene-succinate), poly(pentylene-succinate), poly(hexylene-succinate), poly(octylene-succinate), poly(ethylene-sebacate), poly(propylene-sebacate), poly(butylene-sebacate), poly(pentylene-sebacate), poly(hexylene-sebacate), poly(octylene-sebacate), poly(decylene-sebacate), poly(decylene-decanoate), poly(ethylene-decanoate), poly(ethylene dodecanoate), poly(nonylene-sebacate), poly(nonylene-decanoate), copoly(ethylene-fumarate)-copoly(ethylene-sebacate), copoly(ethylene-fumarate)-copoly(ethylene-decanoate), copoly(ethylene-fumarate)-copoly(ethylene-dodecanoate), copoly(2,2-dimethylpropane-1,3-diol-decanoate)-copoly(nonylene-decanoate), poly(octylene-adipate). Examples of polyamides include poly(ethylene-adipamide), poly(propylene-adipamide), poly(butylenes-adipamide), poly(pentylene-adipamide), poly(hexylene-adipamide), poly(octylene-adipamide), poly(ethylene-succinimide), and poly(propylene-sebecamide). Examples of polyimides include poly(ethylene-adipimide), poly(propylene-adipimide), poly(butylene-adipimide), poly(pentylene-adipimide), poly(hexylene-adipimide), poly(octylene-adipimide), poly(ethylene-succinimide), polypropylene-succinimide), and poly(butylene-succinimide).

The crystalline resin may be present, for example, in an amount of from about 1 to about 50 percent by weight of the toner components, in embodiments from about 5 to about 35 percent by weight of the toner components. The crystalline resin can possess various melting points of, for example, from about 30° C. to about 120° C., in embodiments from about 50° C. to about 90° C. The crystalline resin may have a number average molecular weight ($M_n$), as measured by gel permeation chromatography (GPC) of, for example, from about 1,000 to about 50,000, in embodiments from about 2,000 to about 25,000, and a weight average molecular weight ($M_w$) of, for example, from about 2,000 to about 100,000, in embodiments from about 3,000 to about 80,000, as determined by Gel Permeation Chromatography using polystyrene standards. The molecular weight distribution ($M_w/M_n$) of the crystalline resin may be, for example, from about 2 to about 6, in embodiments from about 3 to about 4.

Examples of diacids or diesters including vinyl diacids or vinyl diesters utilized for the preparation of amorphous polyesters include dicarboxylic acids or diesters such as terephthalic acid, phthalic acid, isophthalic acid, fumaric acid, trimellitic acid, dimethyl fumarate, dimethyl itaconate, cis, 1,4-diacetoxy-2-butene, diethyl fumarate, diethyl maleate, maleic acid, succinic acid, itaconic acid, succinic acid, succinic anhydride, dodecylsuccinic acid, dodecylsuccinic anhydride, glutaric acid, glutaric anhydride, adipic acid, pimelic acid, suberic acid, azelaic acid, dodecanediacid, dimethyl terephthalate, diethyl terephthalate, dimethylisophthalate, diethylisophthalate, dimethylphthalate, phthalic anhydride, diethylphthalate, dimethylsuccinate, dimethylfumarate, dimethylmaleate, dimethylglutarate, dimethyladipate, dimethyl dodecylsuccinate, and combinations thereof. The organic diacids or diesters may be present, for example, in an amount from about 40 to about 60 mole percent of the resin, in embodiments from about 42 to about 52 mole percent of the resin, in embodiments from about 45 to about 50 mole percent of the resin.

Examples of diols which may be utilized in generating the amorphous polyester include 1,2-propanediol, 1,3-propanediol, 1,2-butanediol, 1,3-butanediol, 1,4-butanediol, pentanediol, hexanediol, 2,2-dimethylpropanediol, 2,2,3-trimethylhexanediol, heptanediol, dodecanediol, bis(hydroxyethyl)-bisphenol A, bis(2-hydroxypropyl)-bisphenol A, 1,4-cyclohexanedimethanol, 1,3-cyclohexanedimethanol, xylenedimethanol, cyclohexanediol, diethylene glycol, bis(2-hydroxyethyl)oxide, dipropylene glycol, dibutylene, and combinations thereof. The amount of organic diols selected can vary, and may be present, for example, in an amount from about 40 to about 60 mole percent of the resin, in embodiments from about 42 to about 55 mole percent of the resin, in embodiments from about 45 to about 53 mole percent of the resin.

Polycondensation catalysts which may be utilized in forming either the crystalline or amorphous polyesters include tetraalkyl titanates, dialkyltin oxides such as dibutyltin oxide, tetraalkyltins such as dibutyltin dilaurate, and dialkyltin oxide hydroxides such as butyltin oxide hydroxide, aluminum alkoxides, alkyl zinc, dialkyl zinc, zinc oxide, stannous oxide, or combinations thereof. Such catalysts may be utilized in amounts of, for example, from about 0.01 mole percent to about 5 mole percent based on the starting diacid or diester used to generate the polyester resin.

In embodiments, as noted above, an unsaturated amorphous polyester resin may be utilized as a latex resin. Examples of such resins include those disclosed in U.S. Pat. No. 6,063,827, the disclosure of which is hereby incorporated by reference in its entirety. Exemplary unsaturated amorphous polyester resins include, but are not limited to, poly(propoxylated bisphenol co-fumarate), poly(ethoxylated bisphenol co-fumarate), poly(butyloxylated bisphenol co-fumarate), poly(co-propoxylated bisphenol co-ethoxylated bisphenol co-fumarate), poly(1,2-propylene fumarate), poly(propoxylated bisphenol co-maleate), poly(ethoxylated bisphenol co-maleate), poly(butyloxylated bisphenol co-maleate), poly(co-propoxylated bisphenol co-ethoxylated bisphenol co-maleate), poly(1,2-propylene maleate), poly(propoxylated bisphenol co-itaconate), poly(ethoxylated bisphenol co-itaconate), poly(butyloxylated bisphenol co-itaconate), poly(co-propoxylated bisphenol co-ethoxylated bisphenol co-itaconate), poly(1,2-propylene itaconate), and combinations thereof.

In embodiments, a suitable amorphous resin may include alkoxylated bisphenol A fumarate/terephthalate based polyesters and copolyester resins. In embodiments, a suitable amorphous polyester resin may be a copoly(propoxylated bisphenol A co-fumarate)-copoly(propoxylated bisphenol A co-terephthalate) resin having the following formula (I):

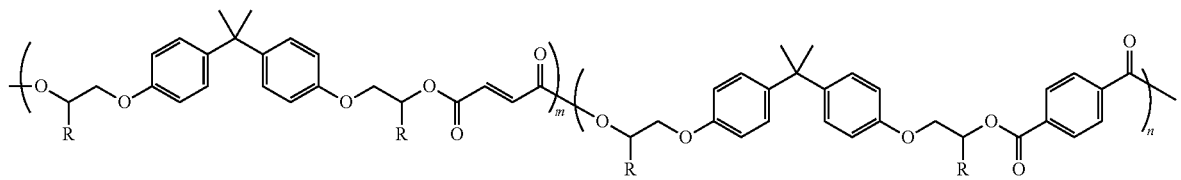

(I)

wherein R may be hydrogen or a methyl group, and m and n represent random units of the copolymer and m may be from about 2 to 10, and n may be from about 2 to 10.

An example of a linear copoly(propoxylated bisphenol A co-fumarate)-copoly(propoxylated bisphenol A co-terephthalate) which may be utilized as a latex resin is available under the trade name SPARII from Resana S/A Industrias Quimicas, Sao Paulo Brazil. Other propoxylated bisphenol A fumarate resins that may be utilized and are commercially available include GTUF and FPESL-2 from Kao Corporation, Japan, and EM181635 from Reichhold, Research Triangle Park, N.C. and the like.

Suitable crystalline resins which may be utilized, optionally in combination with an amorphous resin as described above, include those disclosed in U.S. Patent Application Publication No. 2006/0222991, the disclosure of which is hereby incorporated by reference in its entirety. In embodiments, a suitable crystalline resin may include a resin formed of ethylene glycol and a mixture of dodecanedioic acid and fumaric acid co-monomers with the following formula:

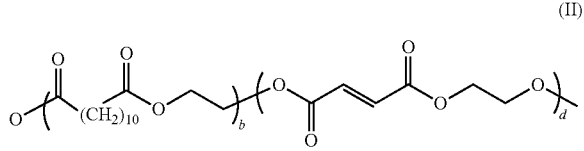

(II)

wherein b is from about 5 to about 2000 and d is from about 5 to about 2000.

For example, in embodiments, a poly(propoxylated bisphenol A co-fumarate) resin of formula I as described above may be combined with a crystalline resin of formula II to form a latex emulsion.

The amorphous resin may be present, for example, in an amount of from about 30 to about 90 percent by weight of the toner components, in embodiments from about 40 to about 80 percent by weight of the toner components. In embodiments, the amorphous resin or combination of amorphous resins utilized in the latex may have a glass transition temperature of from about 30° C. to about 80° C., in embodiments from about 35° C. to about 70° C. In further embodiments, the combined resins utilized in the latex may have a melt viscosity of from about 10 to about 1,000,000 Pa*S at about 130° C., in embodiments from about 50 to about 100,000 Pa*S.

One, two, or more resins may be used. In embodiments, where two or more resins are used, the resins may be in any suitable ratio (e.g., weight ratio) such as for instance of from about 1% (first resin)/99% (second resin) to about 99% (first resin)/1% (second resin), in embodiments from about 10% (first resin)/90% (second resin) to about 90% (first resin)/10% (second resin), Where the resin includes an amorphous resin and a crystalline resin, the weight ratio of the two resins may be from about 99% (amorphous resin): 1% (crystalline resin), to about 1% (amorphous resin): 90% (crystalline resin).

In embodiments the resin may possess acid groups which, in embodiments, may be present at the terminal of the resin. Acid groups which may be present include carboxylic acid groups, and the like. The number of carboxylic acid groups may be controlled by adjusting the materials utilized to form the resin and reaction conditions.

In embodiments, the resin may be a polyester resin having an acid number from about 2 mg KOH/g of resin to about 200 mg KOH/g of resin, in embodiments from about 5 mg KOH/g of resin to about 50 mg KOH/g of resin. The acid containing resin may be dissolved in tetrahydrofuran solution. The acid number may be detected by titration with KOH/methanol solution containing phenolphthalein as the indicator. The acid number may then be calculated based on the equivalent amount of KOH/methanol required to neutralize all the acid groups on the resin identified as the end point of the titration.

Surfactants

In embodiments, colorants, waxes, and other additives utilized to form toner compositions may be in dispersions including surfactants. Moreover, toner particles may be formed by emulsion aggregation methods where the resin and other components of the toner are placed in one or more surfactants, an emulsion is formed, toner particles are aggregated, coalesced, optionally washed and dried, and recovered.

One, two, or more surfactants may be utilized. The surfactants may be selected from ionic surfactants and nonionic surfactants. Anionic surfactants and cationic surfactants are encompassed by the term "ionic surfactants." In embodiments, the surfactant may be utilized so that it is present in an amount of from about 0.01% to about 5% by weight of the toner composition, for example from about 0.75% to about 4% by weight of the toner composition, in embodiments from about 1% to about 3% by weight of the toner composition.

Anionic surfactants which may be utilized include sulfates and sulfonates, sodium dodecylsulfate (SDS), sodium dodecylbenzene sulfonate, sodium dodecylnaphthalene sulfate, dialkyl benzenealkyl sulfates and sulfonates, acids such as abitic acid available from Aldrich, NEOGEN R™, NEOGEN SC™ obtained from Daiichi Kogyo Seiyaku, combinations thereof, and the like. Other suitable anionic surfactants include, in embodiments, DOWFAX™ 2A1, an alkyldiphenyloxide disulfonate from The Dow Chemical Company, and/or TAYCA POWER BN2060 from Tayca Corporation (Japan), which are branched sodium dodecyl benzene sulfonates. Combinations of these surfactants and any of the foregoing anionic surfactants may be utilized in embodiments.

Examples of nonionic surfactants include, but are not limited to alcohols, acids and ethers, for example, polyvinyl alcohol, polyacrylic acid, methalose, methyl cellulose, ethyl cellulose, propyl cellulose, hydroxyethyl cellulose, carboxy methyl cellulose, polyoxyethylene cetyl ether, polyoxyethylene lauryl ether, polyoxyethylene octyl ether, polyoxyethylene octylphenyl ether, polyoxyethylene oleyl ether, polyoxyethylene sorbitan monolaurate, polyoxyethylene stearyl ether, polyoxyethylene nonylphenyl ether, dialkylphenoxy poly(ethyleneoxy)ethanol, mixtures thereof, and the like. In embodiments commercially available surfactants from Rhone-Poulenc such as IGEPAL CA-210™, IGEPAL CA-520™, IGEPAL CA-720™, IGEPAL CO-890™, IGEPAL CO-720™, IGEPAL CO-290™, IGEPAL CA-210™, ANTAROX 890™ and ANTAROX 897™ may be selected.

Examples of cationic surfactants include, but are not limited to, ammoniums, for example, alkylbenzyl dimethyl ammonium chloride, dialkyl benzenealkyl ammonium chloride, lauryl trimethyl ammonium chloride, alkylbenzyl methyl ammonium chloride, alkyl benzyl dimethyl ammonium bromide, benzalkonium chloride, and C12, C15, C17 trimethyl ammonium bromides, mixtures thereof, and the like. Other cationic surfactants include cetyl pyridinium bromide, halide salts of quaternized polyoxyethylalkylamines, dodecylbenzyl triethyl ammonium chloride, and the like, and mixtures thereof. The choice of particular surfactants or combinations thereof as well as the amounts of each to be used are within the purview of those skilled in the art.

Colorants

As the colorant to be added, various known suitable colorants, such as dyes, pigments, mixtures of dyes, mixtures of pigments, mixtures of dyes and pigments, and the like, may be included in the toner. The colorant may be included in the toner in an amount of, for example, about 0.1 to about 35 percent by weight of the toner, or from about 1 to about 15 weight percent of the toner, or from about 3 to about 10 percent by weight of the toner.

As examples of suitable colorants, mention may be made of carbon black like REGAL 330®; magnetites, such as Mobay magnetites MO8029™, MO8060™; Columbian magnetites; MAPICO BLACKS™ and surface treated magnetites; Pfizer magnetites CB4799™, CB5300™, CB5600™, MCX6369™; Bayer magnetites, BAYFERROX 8600™, 8610™; Northern Pigments magnetites, NP604™, NP608™; Magnox magnetites TMB-100™, or TMB-104™; and the like. As colored pigments, there can be selected cyan, magenta, yellow, red, green, brown, blue or mixtures thereof. Generally, cyan, magenta, or yellow pigments or dyes, or mixtures thereof, are used. The pigment or pigments are generally used as water based pigment dispersions.

Specific examples of pigments include SUNSPERSE 6000, FLEXIVERSE and AQUATONE water based pigment dispersions from SUN Chemicals, HELIOGEN BLUE L6900™, D6840™, D7080™, D7020™, PYLAM OIL BLUE™, PYLAM OIL YELLOW™, PIGMENT BLUE 1™ available from Paul Uhlich & Company, Inc., PIGMENT VIOLET 1™, PIGMENT RED 48™, LEMON CHROME YELLOW DCC 1026™, E.D. TOLUIDINE RED™ and BON RED C™ available from Dominion Color Corporation, Ltd., Toronto, Ontario, NOVAPERM YELLOW FGL™, HOSTAPERM PINK E™ from Hoechst, and CINQUASIA MAGENTA™ available from E.I. DuPont de Nemours & Company, and the like. Generally, colorants that can be selected are black, cyan, magenta, or yellow, and mixtures thereof. Examples of magentas are 2,9-dimethyl-substituted quinacridone and anthraquinone dye identified in the Color Index as CI-60710, CI Dispersed Red 15, diazo dye identified in the Color Index as CI-26050, CI Solvent Red 19, and the like. Illustrative examples of cyans include copper tetra(octadecyl sulfonamido) phthalocyanine, x-copper phthalocyanine pigment listed in the Color Index as CI-74160, CI Pigment Blue, Pigment Blue 15:3, and Anthrathrene Blue, identified in the Color Index as CI-69810, Special Blue X-2137, and the like. Illustrative examples of yellows are diarylide yellow 3,3-dichlorobenzidene acetoacetanilides, a monoazo pigment identified in the Color Index as CI 12700, CI Solvent Yellow 16, a nitrophenyl amine sulfonamide identified in the Color Index as Foron Yellow SE/GLN, CI Dispersed Yellow 33 2,5-dimethoxy-4-sulfonanilide phenylazo-4'-chloro-2,5-dimethoxy acetoacetanilide, and Permanent Yellow FGL. Colored magnetites, such as mixtures of MAPICO BLACK™, and cyan components may also be selected as colorants. Other known colorants can be selected, such as Levanyl Black A-SF (Miles, Bayer) and Sunsperse Carbon Black LHD 9303 (Sun Chemicals), and colored dyes such as Neopen Blue (BASF), Sudan Blue OS (BASF), PV Fast Blue B2G01 (American Hoechst), Sunsperse Blue BHD 6000 (Sun Chemicals), Irgalite Blue BCA (Ciba-Geigy), Paliogen Blue 6470 (BASF), Sudan III (Matheson, Coleman, Bell), Sudan II (Matheson, Coleman, Bell), Sudan IV (Matheson, Coleman, Bell), Sudan Orange G (Aldrich), Sudan Orange 220 (BASF), Paliogen Orange 3040 (BASF), Ortho Orange OR 2673 (Paul Uhlich), Paliogen Yellow 152, 1560 (BASF), Lithol Fast Yellow 0991K (BASF), Paliotol Yellow 1840 (BASF), Neopen Yellow (BASF), Novoperm Yellow FG 1 (Hoechst), Permanent Yellow YE 0305 (Paul Uhlich), Lumogen Yellow D0790 (BASF), Sunsperse Yellow YHD 6001 (Sun Chemicals), Suco-Gelb L1250 (BASF), Suco-Yellow D1355 (BASF), Hostaperm Pink E (American Hoechst), Fanal Pink D4830 (BASF), Cinquasia Magenta (DuPont), Lithol Scarlet D3700 (BASF), Toluidine Red (Aldrich), Scarlet for Thermoplast NSD PS PA (Ugine Kuhlmann of Canada), E.D. Toluidine Red (Aldrich), Lithol Rubine Toner (Paul Uhlich), Lithol Scarlet 4440 (BASF), Bon Red C (Dominion Color Company), Royal Brilliant Red RD-8192 (Paul Uhlich), Oracet Pink RF (Ciba-Geigy), Paliogen Red 3871K (BASF), Paliogen Red 3340 (BASF), Lithol Fast Scarlet L4300 (BASF), combinations of the foregoing, and the like.

Waxes

In addition to the latex and colorant, the toners of the present disclosure also optionally contain a wax, which can be either a single type of wax or a mixture of two or more different waxes. A single wax can be added to toner formulations, for example, to improve particular toner properties, such as toner particle shape, presence and amount of wax on the toner particle surface, charging and/or fusing characteristics, gloss, stripping, offset properties, and the like. Alternatively, a combination of waxes can be added to provide multiple properties to the toner composition.

Suitable waxes include, for example, submicron wax particles in the size range of from about 50 to about 500 nanometers, in embodiments of from about 100 to about 400 nanometers in volume average diameter, suspended in an aqueous phase of water and an ionic surfactant, nonionic surfactant, or mixtures thereof. The ionic surfactant or nonionic surfactant may be present in an amount of from about 0.5 to about 10 percent by weight, and in embodiments of from about 1 to about 5 percent by weight of the wax.

The wax dispersion according to embodiments of the present disclosure includes a wax for example, a natural vegetable wax, natural animal wax, mineral wax and/or synthetic wax. Examples of natural vegetable waxes include, for example, carnauba wax, candelilla wax, Japan wax, and bayberry wax. Examples of natural animal waxes include, for example, beeswax, punic wax, lanolin, lac wax, shellac wax, and spermaceti wax. Mineral waxes include, for example, paraffin wax, microcrystalline wax, montan wax, ozokerite wax, ceresin wax, petrolatum wax, and petroleum wax. Synthetic waxes of the present disclosure include, for example, Fischer-Tropsch wax, acrylate wax, fatty acid amide wax, silicone wax, polytetrafluoroethylene wax, polyethylene wax, polypropylene wax, and mixtures thereof.

Examples of polypropylene and polyethylene waxes include those commercially available from Allied Chemical and Baker Petrolite, wax emulsions available from Michelman Inc. and the Daniels Products Company, EPOLENE N-15 commercially available from Eastman Chemical Products, Inc., Viscol 550-P, a low weight average molecular weight polypropylene available from Sanyo Kasel K.K., and similar materials. In embodiments, commercially available polyethylene waxes possess a molecular weight (Mw) of from about 1,000 to about 1,500, and in embodiments of from about 1,250 to about 1,400, while the commercially available polypropylene waxes have a molecular weight of from about 4,000 to about 5,000, and in embodiments of from about 4,250 to about 4,750.

In embodiments, the waxes may be functionalized. Examples of groups added to functionalize waxes include amines, amides, imides, esters, quaternary amines, and/or carboxylic acids. In embodiments, the functionalized waxes may be acrylic polymer emulsions, for example, Joncryl 74, 89, 130, 537, and 538, all available from Johnson Diversey, Inc, or chlorinated polypropylenes and polyethylenes commercially available from Allied Chemical and Petrolite Corporation and Johnson Diversey, Inc.

The wax may be present in an amount of from about 1 to about 30 percent by weight, and in embodiments from about 2 to about 20 percent by weight of the toner.

Basic Buffer Solutions

In embodiments, the buffer system may include at least two of acids, salts, bases, organic compounds, and combinations thereof in a solution with deionized water as the solvent.

Suitable acids which may be utilized to form the buffer system include, but are not limited to, organic and/or inorganic acids such as acetic acid, citric acid, hydrochloric acid, boric acid, formic acid, oxalic acid, phthalic acid, salicylic acid, combinations thereof, and the like.

Suitable salts or bases which may be utilized to form the buffer system include, but are not limited to, metallic salts of aliphatic acids or aromatic acids and bases, such as sodium hydroxide (NaOH), sodium tetraborate, potassium acetate, zinc acetate, sodium dihydrogen phosphate, disodium hydrogen phosphate, potassium formate, potassium hydroxide, sodium oxalate, sodium phthalate, potassium salicylate, combinations thereof, and the like.

Suitable organic compounds which may be utilized to form the buffer system include, but are not limited to, tris(hydroxymethyl)aminomethane (TRIS), Tricine, Bicine, Glycine, HEPES, Trietholamine hydrochloride, 3-(N-morpholino)propanesulfonic acid (MOPS), combinations thereof, and the like.

In embodiments, a suitable buffer system may include a combination of acids and organic compounds. For example, a buffer system may include TRIS and hydrochloric acid.

The amount of acid and organic compound utilized in forming the buffer system, as well as deionized water utilized in forming a buffer solution, may vary depending upon the acid used, the organic compound used, and the composition of the toner particles. As noted above, a buffer system may include both an acid and an organic compound. In such a case, the amount of acid in the buffer system may be from about 1% to about 40% by weight of the buffer system, such as from about 2% to about 30% by weight. The amount of organic compound in the buffer system may be from about 10% to about 50% by weight of the buffer system, such as from about 30% to about 40% by weight of the buffer system.

The amount of acid and/or organic compound in the buffer system may be in amounts so that the pH of the buffer system is from about 7 to about 12, such as from about 7 to about 9, from about 8 to about 9, or about 9.

The buffer system may be added to the toner slurry as described above so that the pH of the final toner slurry is from about 6 to about 9, such as from about 7 to about 8.

Chelating Agents

In embodiments a chelating agent may be added to the toner mixture during aggregation of the particles. Such chelating agents and their use in forming toners are described, for example, in U.S. Pat. No. 7,037,633, the disclosure of which is hereby incorporated by reference in its entirety. Examples of suitable chelating agents include, but are not limited to, chelates based on ammonia, diamine, triamine or tetramine. In embodiments, suitable chelating agents include, for example, organic acids such as ethylene diamine tetra acetic acid (EDTA), GLDA (commercially available L-glutamic acid N,N diacetic acid), humic and fulvic acids, peta-acetic and tetra-acetic acids; salts of organic acids including salts of methylglycine diacetic acid (MGDA), and salts of ethylenediamine disuccinic acid (EDDS); esters of organic acids including sodium gluconate, magnesium gluconate, potassium gluconate, potassium and sodium citrate, nitrotriacetate (NTA) salt; substituted pyranones including maltol and ethyl-maltol; water soluble polymers including polyelectrolytes that contain both carboxylic acid (COOH) and hydroxyl (OH) functionalities; and combinations thereof. Examples of specific chelating agents include

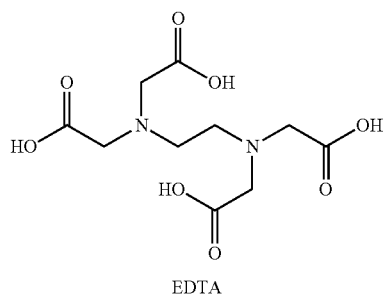

EDTA

-continued

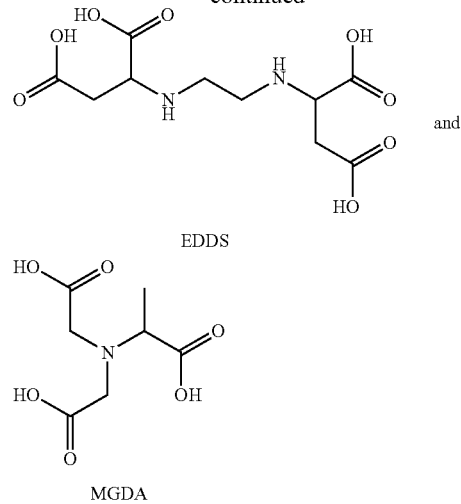

EDDS

MGDA and

In embodiments, EDTA, a salt of methylglycine diacetic acid (MGDA), or a salt of ethylenediamine disuccinic acid (EDDS), may be utilized as a chelating agent.

The amount of sequestering agent added may be from about 0.25 pph to about 4 pph, in embodiments from about 0.5 pph to about 2 pph. The chelating agent complexes or chelates with the coagulant metal ion, such as aluminum, thereby extracting the metal ion from the toner aggregate particles. The resulting complex is removed from the particle to lower the amount of retained aluminum in the toner. The amount of metal ion extracted may be varied with the amount of sequestering agent, thereby providing controlled crosslinking. For example, in embodiments, adding about 0.5 pph of the sequestering agent (such as EDTA) by weight of toner, may extract from about 40 to about 60 percent of the aluminum ions, while the use of about 1 pph of the sequestering agent (such as EDTA) may result in the extraction of from about 95 to about 100 percent of the aluminum.

In embodiments, the toners may be blended at speeds from about 1500 rpm to about 7000 rpm, in embodiments, from about 3000 revolutions per minute (rpm) to about 4500 rpm, for a period of time from about 2 minutes to about 30 minutes, in embodiments, from about 5 minutes to about 15 minutes, and at temperatures from about 20° C. to about 50° C., in embodiments, from about 22° C. to about 35° C.

Acidic Buffers

Suitable acids which may be utilized to form the buffer system include, but are not limited to, aliphatic acids and/or aromatic acids such as acetic acid, citric acid, formic acid, oxalic acid, phthalic acid, salicylic acid, combinations thereof, and the like. Suitable salts which may be utilized to form the buffer system include, but are not limited to, metallic salts of aliphatic acids or aromatic acids, such as sodium acetate, sodium acetate trihydrate, potassium acetate, zinc acetate, sodium hydrogen phosphate, potassium formate, sodium oxalate, sodium phthalate, potassium salicylate, combinations thereof, and the like.

In embodiments, a suitable buffer system may include a combination of acids and salts. For example, in embodiments, a buffer system may include sodium acetate and acetic acid.

In embodiments, a buffer system of the present disclosure may be in a solution with deionized water as the solvent.

The amount of acid and salts utilized in forming the buffer system, as well as deionized water utilized in forming a buffer solution, may vary depending upon the acid used, the salt used, and the composition of the toner particles. As noted above, in embodiments a buffer system may include both an acid and a salt. In such a case, the amount of acid in the buffer system may be from about 1% by weight to about 40% by weight of the buffer system, in embodiments from about 2% by weight to about 30% by weight of the buffer system. The amount of salt in the buffer system may be from about 10% by weight to about 50% by weight of the buffer system, in embodiments from about 30% by weight of the buffer system to about 40% by weight of the buffer system.

The amount of acid and/or salt in the buffer system may be in amounts so that the pH of the buffer system is from about 3 to about 7, in embodiments from about 4 to about 6. The buffer system may be added to the toner slurry as described above so that the pH of the toner slurry is from about 4 to about 7, in embodiments from about 5.8 to about 6.5.

As noted above, one of the last steps in the CSTR process of the present disclosure is coalescing toner particles. Coalescing may include stirring and heating as described above.

The pH of the mixture is then lowered with, for example, an acid or acidic buffer to coalesce the toner aggregates. Suitable acids include, for example, nitric acid, sulfuric acid, hydrochloric acid, citric acid or acetic acid. The amount of acid added may be from about 4 to about 30 percent by weight of the mixture, and in embodiments from about 5 to about 15 percent by weight of the mixture.

After coalescence, the mixture may be cooled to room temperature, such as from about 20° C. to about 25° C. The cooling may be rapid or slow, as desired. A suitable cooling method may include introducing cold water to a jacket around the reactor or a heat exchanger to quench. After cooling, the toner particles may be optionally washed with water, and then dried. Drying may be accomplished by any suitable method for drying including, for example, freeze-drying.

Coagulants

The emulsion aggregation process for making toners of the present disclosure uses at least a coagulant, such as a monovalent metal coagulant, a divalent metal coagulant, a polyion coagulant, or the like. A variety of coagulants are known in the art, as described above. As used herein, "polyion coagulant" refers to a coagulant that is a salt or oxide, such as a metal salt or metal oxide, formed from a metal species having a valence of at least 3, and desirably at least 4 or 5. Suitable coagulants thus include, for example, coagulants based on aluminum such as polyaluminum halides such as polyaluminum fluoride and polyaluminum chloride (PAC), polyaluminum silicates such as polyaluminum sulfosilicate (PASS), polyaluminum hydroxide, polyaluminum phosphate, aluminum sulfate, and the like. Other suitable coagulants include, but are not limited to, tetraalkyl titinates, dialkyltin oxide, tetraalkyltin oxide hydroxide, dialkyltin oxide hydroxide, aluminum alkoxides, alkylzinc, dialkyl zinc, zinc oxides, stannous oxide, dibutyltin oxide, dibutyltin oxide hydroxide, tetraalkyl tin, and the like. Where the coagulant is a polyion coagulant, the coagulants may have any desired number of polyion atoms present. For example, suitable polyaluminum compounds in embodiments have from about 2 to about 13, such as from about 3 to about 8, aluminum ions present in the compound Such coagulants can be incorporated into the toner particles during particle aggregation. As such, the coagulant can be present in the toner particles, exclusive of external additives and on a dry weight basis, in amounts of from 0 to about 5 percent by weight of the toner particles, such as from about greater than 0 to about 3 percent by weight of the toner particles.

Uses

Toner particles produced utilizing the CSTR system in the present disclosure may have a size of about 1 micron to about 20 microns, in embodiments about 2 microns to about 15 microns, in embodiments about 3 microns to about 7 microns.

Toner in accordance with the present disclosure may be used in a variety of imaging devices including printers, copy machines, and the like. The toners generated in accordance with the present disclosure are excellent for imaging processes, especially xerographic processes and are capable of providing high quality colored images with excellent image resolution, acceptable signal-to-noise ratio, and image uniformity. Further, toners of the present disclosure may be selected for electrophotographic imaging and printing processes such as digital imaging systems and processes.

Developer compositions may be prepared by mixing the toners obtained with the processes disclosed herein with known carrier particles, including coated carriers, such as steel, ferrites, and the like. Such carriers include those disclosed in U.S. Pat. Nos. 4,937,166 and 4,935,326, the disclosures of each of which are hereby incorporated by reference in their entirety. The carriers may be present from about 2 percent by weight of the toner to about 8 percent by weight of the toner, in embodiments from about 4 percent by weight to about 6 percent by weight of the toner. The carrier particles may also include a core with a polymer coating thereover, such as polymethylmethacrylate (PMMA), having dispersed therein a conductive component like conductive carbon black. Carrier coatings include silicone resins such as methyl silsesquioxanes, fluoropolymers such as polyvinylidiene fluoride, mixtures of resins not in close proximity in the triboelectric series such as polyvinylidiene fluoride and acrylics, thermosetting resins such as acrylics, mixtures thereof and other known components.

Imaging methods are also envisioned with the toners disclosed herein. Such methods include, for example, some of the above patents mentioned above and U.S. Pat. Nos. 4,265,990, 4,858,884, 4,584,253 and 4,563,408, the disclosures of each of which are hereby incorporated by reference in their entirety. The imaging process includes the generation of an image in an electronic printing magnetic image character recognition apparatus and thereafter developing the image with a toner composition of the present disclosure. The formation and development of images on the surface of photoconductive materials by electrostatic means is well known. The basic xerographic process involves placing a uniform electrostatic charge on a photoconductive insulating layer, exposing the layer to a light and shadow image to dissipate the charge on the areas of the layer exposed to the light, and developing the resulting latent electrostatic image by depositing on the image a finely-divided electroscopic material, for example, toner. The toner may normally be attracted to those areas of the layer, which retain a charge, thereby forming a toner image corresponding to the latent electrostatic image. This powder image may then be transferred to a support surface such as paper. The transferred image may subsequently be permanently affixed to the support surface by heat. Instead of latent image formation by uniformly charging the photoconductive layer and then exposing the layer to a light and shadow image, one may form the latent image by directly charging the layer in image configuration. Thereafter, the powder image may be fixed to the photoconductive layer, eliminating the powder image transfer.

EXAMPLE 1

In a 4 liter plastic beaker were mixed about 823 grams of amorphous core latexes, about 140 grams of a crystalline core latex, about 2259 grams of deionized water (DIW), about 3.2 grams of an alkyldiphenyloxide disulfonate surfactant (DOWFAX™ 2A1, from the Dow Chemical Company), about 208 grams of a cyan pigment (from SUN), and about 179 grams of a polythene wax (from IGI). The toner slurry was then pH adjusted to about 4.2 with about 126 grams 0.3 M nitric acid ($HNO_3$). This solution was cooled to about 0° C. Additional feedstock was made in this way as needed to replenish the feed tanks to the continuous reactor.

In a separate plastic beaker were mixed about 10.6 grams of aluminum sulfate and about 131 grams of DIW. This solution was cooled to about 0° C. Additional feedstock was made in this way as needed to replenish the feed tanks to the continuous reactor.

Pumps delivered the above latex and aluminum sulphate solutions from the feed tanks to stage 1 of the reactor at a rate of about 15.40 grams/minute and 0.59 grams/minute, respectively. The jacket temperature of stage 1 was set to about 5° C. This material then flowed from stage 1 through stages 2 and 3. The jackets for stages 2 and 3 were set to about 35° C. and about 45° C., respectively.

In a separate plastic beaker were mixed about 236 grams of amorphous shell latexes and about 37 grams of deionized water (DIW). The latex slurry was pH adjusted to about pH 3.3 with 0.3M nitric acid. This material was delivered continuously to stage 4 of the reactor using a pump at a rate of about 2.29 grams/minute. The jacket temperature of stage 4 was set to about 45° C. The shaft in stages 1 through 4 rotated at a speed of about 280 revolutions per minute (rpm).

A 1M sodium hydroxide solution was pumped at a rate of about 0.11 grams/minute to freeze the particles in stage 5 of the reactor. The jacket of stage 5 was set to about 45° C. The shaft in stages 5 to 8 rotated at a speed of about 150 revolutions per minute (rpm).

Ethylene diamine tetra acetic acid (EDTA) (commercially available as VERSENE-100 from the Dow Chemical Company) was pumped at a rate of about 0.66 grams/minute into stage 6 to chelate ions out of the particles. The jacket temperature of stage 6 was set to about 45° C.

The material from stage 6 flowed into stage 7 where the jacket temperature was set to about 70° C. A 1M sodium hydroxide solution was pumped at a rate of about 0.30 g/minute to control the pH in stage 7 of the reactor. The material from stage 7 flowed into stage 8 where the jacket temperature was set to about 85° C. A 3M sodium acetate-acetic acid buffer solution was pumped into reactor 8 so that this addition accelerated the coalescence of the particles and attained the desired particle properties. The material from stage 8 exited the reactor and was downstream processed to obtain the desired material.

EXAMPLE 2

Stage 1: Cold Addition:

In the first stage 10, also known as the cold addition stage 10, cold feeds (between about 0° C. and about 10° C.) of $Al_2(SO_4)_3$ in the first stream 2, and a mixture of various resin emulsions, wax dispersions, and colorant dispersions in the second stream 4, were pumped into the continuous reactor system 100. The wall of the reactor was kept at a temperature between about −10° C. and about 10° C. through an external heat exchanger (described below). In embodiments, such temperature was set at about 5° C. As the materials of the first stream 2 and the second stream 4 were pumped into the reactor system 100, such materials moved up from one stage to the next through an orifice plate 6 that separated the first and second stages (e.g., first aggregation stage 20). The orifice plate 6 minimized complete mixing of the materials in the first and second stages 10, 20. This ensured that each stage acted as a distinct continuous stirred tank reactor (CSTR). The remaining stages were separated in a similar manner through orifice plates 6, as seen in FIG. 1. In the cold addition stage 10, a shaft 330 (see FIG. 3) rotated at a speed between about 0 and about 600 revolutions per minute (rpm). On the shaft 330 was affixed an impeller 310 (see FIG. 3) whose design was modified as needed to obtain the desired degree of mixing for the first stage 10.

Stage 2: First Aggregation:

As materials entered the second stage 20, (i.e., the first aggregation stage), the materials were heated by an external jacket and heating bath 22 set at a temperature between about 0° C. and about 50° C. In embodiments, such temperature was set at about 35° C. As the materials flowed into reactor 20 and were mixed, heat was transferred from the internal walls of the reactor to the process fluid by convective and conductive heat transfer. This temperature change triggered the aggregation of the latexes and dispersions such that particles having an average diameter of from about 1 μm to about 20 μm were formed.

Stage 3: Second Aggregation:

The materials from the second stage 20, flowed through an orifice plate 6 into the third stage 30 (i.e., the second aggregation stage 30), where the materials were further heated through contact with the reactor jacket to achieve a temperature that was about 1° C. to about 40° C. higher than that of the second stage 20. In embodiments, such temperature was about 10° C. higher, in embodiments at a temperature of about 45° C. This higher temperature caused the particles to grow further in size.

Stage 4: Shell Addition:

The materials from the third stage 30, flowed through the orifice plate 6 and into the fourth stage 40 (i.e., the shell addition stage 40), where fresh latex 14 was pumped in to form a shell around the particles formed in the prior stages 10, 20, and 30. The jacket temperature in the fourth stage 40 was from about 20° C. to about 60° C., in embodiments about 45° C. One shaft 330 (see FIG. 3) rotated in stages 1 through 4 to stir the contents of each stage 10, 20, 30, and 40. The impeller 310, as shown in FIG. 3, was designed to provide the desired stirring in each stage 10, 20, 30, and 40.

Stage 5: Freeze:

In the fifth stage 50, sodium hydroxide, or any other suitable solution such as a buffer solution 24, was pumped in to stop the growth of the particles. This sodium hydroxide solution mixed with the materials entering this stage from the fourth stage 40 through the previous orifice plate 6. The freezing process ensured that the desired particle sizes were achieved for the end use application. The temperature in this reactor was controlled by an external jacket and heating bath set at a temperature from about 20° C. to about 60° C., in embodiments about 45° C.

Stage 6: Chelate:

In the sixth stage 60, a chelating solution 34 was added to remove ions from the particles. This chelating solution was a solution containing ethylenediamine tetraacetic acid and/or one containing colloidal silica. The chelating solution 34 was mixed with the materials entering this stage from the fifth stage 50 through the previous orifice plate 6. The temperature in this reactor was controlled by the external jacket and heating bath 32 set at a temperature from about 20° C. to about 60° C., in embodiments about 45° C.

Stage 7: Ramp:

In the seventh stage 70, the jacket temperature was controlled by an external jacket and heating bath 42 and was increased from about 40° C. to about 100° C., in embodiments about 70° C., to raise the temperature of the slurry that entered through the orifice plate 6 that separated the sixth and seventh stages 60, 70. In addition, a sodium hydroxide solution 44 was added to this reactor continuously to control the pH at a level of from about 7 to about 9.

Stage 8: Coalescence:

In the eighth stage 80, the jacket temperature was controlled by an external jacket and heating bath 52 and was further increased to from about 50° C. to about 110° C., in embodiments about 85° C., to raise the temperature of the slurry that entered through the orifice plate 6 that separated the seventh and eighth stages 70, 80. In addition, a sodium hydroxide solution or buffer solution 54 was added to accelerate the coalescence process. Shaft 320 (see FIG. 3) rotated in the fifth, sixth, seventh, and eighth stages 50, 60, 70, and 80, to stir the contents of each stage 50, 60, 70, and 80.

Additionally, as shown in FIGS. 2 and 3, pH probes 240 were mounted on the reactor such that the pH was continuously monitored. Also, thermocouples (250) were mounted such that the temperature of each stage was continuously monitored.

Exiting Reactor:

The material that exited the eighth stage 80 was collected in a tank 90 and later processed into the final product. FIG. 2 illustrates a three-dimensional view 200 of the continuous emulsion aggregation (EA) system in accordance with the present disclosure. The reactor system 100 operatively communicated with at least two motor drives 210 and at least two pumps 220. The reactor system 200 included a plurality of heating jackets 230 across its length in equidistant positions. Additionally, the reactor system 100 included a plurality of pH probes 240 (see FIGS. 2 and 3).

What is claimed is:

1. A continuous stirred tank reactor for the production of particles by emulsion aggregation, comprising an eight stage reactor containing;
   at least one feed tank of raw materials;
   at least one reactor for facilitating cold addition;
   at least two reactors for facilitating an aggregation process;
   at least one reactor for facilitating a shell addition process;
   at least one reactor for facilitating a freeze process;
   at least one reactor for facilitating a chelating process;
   at least one reactor for facilitating a ramp-up process; and
   at least one reactor for facilitating a coalescence process;
   wherein the reactors are sequentially assembled in a series configuration and separated from each other by orifice plates.

2. The continuous stirred tank reactor as in claim 1, wherein material flows from one reactor to the next via a short conduit.

3. The continuous stirred tank reactor as in claim 1, wherein fluid is transferred continuously from one reactor to the next by positive or negative pressure without using a pump.

4. The continuous stirred tank reactor as in claim 1, further comprising a particle space time yield from about 10 g particles/L/hr to about 500 g particles/L/hr.

5. The continuous stirred tank reactor as in claim 1, wherein each of the reactors is temperature controlled by externally applied cooling or heating devices.

6. The continuous stirred tank reactor as in claim 1, wherein the materials are mixed at independent rates for each reactor in order to control particle size and particle size distribution.

7. The continuous stirred tank reactor as in claim 1, wherein reactor temperatures are incrementally higher in the direction of material flow.

8. The continuous stirred tank reactor as in claim 1, wherein a residence time of each reactor is from about 0.5 minutes to about 60 minutes.

9. The continuous stirred tank reactor as in claim 1, wherein pH is controlled in each reactor by altering the feed rate of basic or acidic solutions to each reactor, the pH being, measured by a plurality of pH probes.

10. The continuous stirred tank reactor as in claim 1, wherein each reactor is associated with an impeller to assist movement of materials in the reactor.

11. A continuous emulsion aggregation method for producing toner particles, the method comprising:
    Providing an eight stage reactor containing a plurality of reactors sequentially assembled in a series configuration and separated from each other by orifice plates;
    introducing raw materials for the toner particles into a continuous stirred tank reactor system;
    facilitating cold addition via a first reactor;
    facilitating an aggregation process via a second reactor and a third reactor;
    facilitating a shell addition process via a fourth reactor;
    facilitating a freeze process via a fifth reactor;
    facilitating a chelating process via a sixth reactor;
    facilitating a ramp-up process via, a seventh reactor; and
    facilitating a coalescence process via an eighth reactor.

12. The method as in claim 11, wherein a space time yield of the particles in the reactor is from about 10 g particles/L/hr to about 500 g particles/L/hr.

13. The method as in claim 11, wherein each of the reactors is temperature controlled by externally applied cooling or heating devices.

14. The method as in claim 11, wherein a shell latex is continuously or periodically added into at least the fourth reactor; and wherein a chelating agent is continuously or periodically added into at least the sixth reactor.

15. The method as in claim 11, wherein the materials are mixed at independent rates for each reactor in order to control particle size and particle size distribution.

16. The method as in claim 11, wherein reactor temperatures are incrementally higher in the direction of material flow.

17. The method as in claim 11, wherein a residence time of each reactor is from about 0.5 minutes to about 60 minutes, and wherein the pH is controlled in each reactor by altering the feed rate of basic or acidic solutions to each reactor, the pH being measured by a plurality of pH probes.

* * * * *